US010220434B2

(12) United States Patent
Bush et al.

(10) Patent No.: US 10,220,434 B2
(45) Date of Patent: Mar. 5, 2019

(54) METHODS FOR PRODUCING FORGED PRODUCTS AND OTHER WORKED PRODUCTS

(71) Applicant: ALCOA INC., Pittsburgh, PA (US)

(72) Inventors: Dustin M. Bush, Avon Lake, OH (US); Eric V. Roegner, Hudson, OH (US); Edward L. Colvin, Newport, VA (US); Larry N. Mueller, Solon, OH (US); Brandon Hendrickson Bodily, Broadview Heights, OH (US); Roberto J. Rioja, Murrysville, PA (US)

(73) Assignee: Arconic Inc., Pittsburgh, PA (US)

( * ) Notice: Subject to any disclaimer, the term of this patent is extended or adjusted under 35 U.S.C. 154(b) by 306 days.

(21) Appl. No.: 15/083,007

(22) Filed: Mar. 28, 2016

(65) Prior Publication Data

US 2016/0207092 A1   Jul. 21, 2016

Related U.S. Application Data

(63) Continuation of application No. 14/327,218, filed on Jul. 9, 2014, now Pat. No. 9,296,036.
(Continued)

(51) Int. Cl.
*B21J 5/02* (2006.01)
*C22F 1/18* (2006.01)
(Continued)

(52) U.S. Cl.
CPC .................. *B21J 5/02* (2013.01); *B21J 1/003* (2013.01); *B21J 1/06* (2013.01); *B21J 5/002* (2013.01);
(Continued)

(58) Field of Classification Search
CPC ....... B21J 5/02; B21J 5/002; B21J 1/06; B21J 1/003; B22F 5/04; B22F 3/1055;
(Continued)

(56) References Cited

U.S. PATENT DOCUMENTS 4,055,975 A * 11/1977 Serfozo ..................... B21J 3/00
                                                     29/DIG. 45
5,118,363 A    6/1992 Chakrabarti et al. ......... 148/671
(Continued)

FOREIGN PATENT DOCUMENTS

EP      2112242     10/2009
EP      2113583     11/2009
(Continued)

OTHER PUBLICATIONS

Phase composition and microstructure of Ti-6AI-4V alloy after hydrogen-plastic working, Ivanov et al., Materials Physics and Mechanics 10 (2010), pp. 62-71.*
(Continued)

*Primary Examiner* — Moshe Wilensky
(74) *Attorney, Agent, or Firm* — Greenberg Traurig, LLP

(57) ABSTRACT

Methods for producing forged products and other worked products are disclosed. In one embodiment, a method comprises using additive manufacturing to produce a metal shaped-preform and, after the using step, forging the metal shaped-preform into a final forged product. The final forged product may optionally be annealed.

20 Claims, 10 Drawing Sheets

Related U.S. Application Data

(60) Provisional application No. 61/955,027, filed on Mar. 18, 2014, provisional application No. 61/913,077, filed on Dec. 6, 2013, provisional application No. 61/895,046, filed on Oct. 24, 2013, provisional application No. 61/845,260, filed on Jul. 11, 2013, provisional application No. 61/844,744, filed on Jul. 10, 2013.

(51) Int. Cl.
| | | |
|---|---|---|
| F01D 5/28 | (2006.01) | |
| C23C 4/12 | (2016.01) | |
| C23C 4/08 | (2016.01) | |
| B21J 1/00 | (2006.01) | |
| B21J 1/06 | (2006.01) | |
| C23C 4/01 | (2016.01) | |
| B23P 15/02 | (2006.01) | |
| B22F 3/105 | (2006.01) | |
| B22F 5/04 | (2006.01) | |
| B21J 5/00 | (2006.01) | |
| C22C 1/04 | (2006.01) | |

(52) U.S. Cl.
CPC .............. *B22F 3/1055* (2013.01); *B22F 5/04* (2013.01); *B23P 15/02* (2013.01); *C22F 1/18* (2013.01); *C22F 1/183* (2013.01); *C23C 4/01* (2016.01); *C23C 4/08* (2013.01); *C23C 4/12* (2013.01); *F01D 5/28* (2013.01); *B22F 2998/10* (2013.01); *B22F 2999/00* (2013.01); *C22C 1/0458* (2013.01); *C22C 1/0491* (2013.01); *F05D 2230/22* (2013.01); *F05D 2230/25* (2013.01); *F05D 2230/31* (2013.01); *F05D 2300/174* (2013.01); *Y02P 10/295* (2015.11); *Y10T 29/4998* (2015.01)

(58) Field of Classification Search
CPC .. B22F 2999/00; B22F 2998/10; B23P 15/02; C23C 4/01; C23C 4/12; C23C 4/08; F01D 5/28; C22F 1/18; C22F 1/183
See application file for complete search history.

(56) References Cited

U.S. PATENT DOCUMENTS

| | | | |
|---|---|---|---|
| 2004/0244887 A1* | 12/2004 | Fukai | B21J 1/04 148/670 |
| 2006/0107718 A1* | 5/2006 | James | B21K 21/16 72/208 |
| 2010/0291401 A1* | 11/2010 | Medina | B23K 15/0086 428/593 |
| 2012/0183410 A1* | 7/2012 | Imano | F01D 5/14 416/241 R |
| 2014/0161618 A1* | 6/2014 | Walker | B23K 15/0006 416/223 A |

FOREIGN PATENT DOCUMENTS

| | | |
|---|---|---|
| GB | 1517283 | 7/1978 |
| WO | 2012112779 A2 † | 8/2012 |
| WO | WO2012/112779 | 8/2012 |

OTHER PUBLICATIONS

Huang, Weidong, et al. "Laser solid forming of metal powder materials", *Cailiao Gongcheng (Journal of Materials Engineering)*(*China*) 40-43, appears to have been published in 2002. (abstract only in English).
Zhanglong, Zhao, et al. "Microstructures and Properties of TC17 Powder Metallurgy Titanium Alloy Prepared by Laser Sintering/ Isothermal Forging." *Rare Metal Materials and Engineering* 38(6) (2009): 1104-1107. (abstract only in English).
Zhang, Shuzhi, "Study on Hot Deformation Behavior and Processing Map of T1-46A1-2Cr-4Nb-0.3Y Alloy", Dissertation for the Master's Degree in Engineering, B022-133, Chinese Master's Theses Full Text Database, Engineering Science and Technology 1, pp. 1-5, appears to have been published in 2009 or 2010. (abstract only in English).
Ti6Ai4V Titanium Alloy—Arcam EBM System, marketing brochure, 2008, 3 pages, Arcam AB, Krokslätts, Fabriker 27A, SE 431 37, Mölndal, Sweden.
Cowles, B. A., "High cycle fatigue in aircraft gas turbines—an industry perspective", *International Journal of Fracture*, vol. 80, pp. 147-163, 1996.
Martina, F., et al., "Investigation of the Benefits of Plasma Deposition for the Additive Layer Manufacture of Ti-6A1-4V", *Journal of Materials Processing Technology*, vol. 212:6, pp. 1377-1386, Jun. 2012.
Welsch, G., et al., "Deformation Characteristics of Age Hardened Ti-6A1-4V", *Metallurgical Transactions A*, vol. 8A, pp. 169-177, Jan. 1977.
Chinese Office Action, dated Sep. 8, 2017, from related Chinese Patent Application No. 201480039061.7 (English translation).
Third Party Observations, dated Nov. 8, 2017, filed in related European Patent Application No. 14823.292.9, pp. 1-8.
ASM Handbook, vol. 14—Forming and Forging, pp. 1-9, ASM International, 1998.
"Laser sintering system EOSINT M 280 for the production of tooling inserts, prototype parts and end products directly in metal", Sep. 2017, EOS GmbH, Munich, Germany, 4 pages.
Debiccari, A. et al., "Additive Manufacturing for Superalloys— Producibility and Cost Validation (Prepint)" pp. 1-27, Mar. 2011, Air Force Research Laboratory Materials and Manufacturing Directorate Wright-Patterson Air Force Base, OH 45433-7750.
Huang, et al., "An overview of development in additive manufacturing for metal parts in foreign countries", *Defense Manufacturing Technology*, Issue 5, Oct. 2012, pp. 26-30.
Schulte, R., "Titanium Europe 2013: Forty Industry Leaders Review the State of the Metal and its Applications", International Titanium Association, Mar. 5-7, 2013, Hamburg, Germany, 9 pages.
Semiatin, S.L., et al. "Plastic Flow and Microstructure Evolution during Thermomechanical Processing of Laser-Deposited Ti-6A1-4V Preforms" Metallurgical and Materials Transactions A, vol. 32A, Jul. 2001, pp. 1801-1811.
Supplemental European Search Report, dated Feb. 1, 2017, from related European Patent Application No. 14823292.9.
First Office Action, dated Nov. 22, 2016, from related Chinese Patent Application No. 201480039061.7 (English translation).
Huang, Weidong, et al. "Laser solid forming of metal powder materials", *Cailiao Gongcheng (Journal of Materials Engineering)*(*China*) 40-43, appears to have been published in 2002. (Full English translation).
Semiatin S.L., Kobryn P.A., Roush E.D., Furrer D.U., Howson T.E., Boyer R.R. and Chellman D.J., Plastic Flow and Microstructure Evolution during, pp. 1801-1811, Jul. 2001, Metallurgical and Materials Transactions A, vol. 32A.†
Antonysamy A.A., Microstructure, Texture and MechanicalProperty, pp. 1-315, 2012, Thesis at theUniversity of Manchester.†
Martina F., Williams S., Colegrove P., High-Pressure Rolling , p. 1, Abstract presented at the Aeromat conference and exposition on Apr. 4, 2013, Bellevue, Washington USA—Meydenbauer Center.†
Facchini L., Magalini E, Robotti P, Molinari A. Microstructure and mechanical properties of Ti-6Al-4V , pp. 171-178, 2009, Rapid Prototyping Journal vol. 15, No. 3.†
Thone M., Leuders S., Riemer A., Troster T., Richard H.A., Influence of heat-treatment on Selective, pp. 492-498, 23rd Annual International Solid Freeform Fabrication Symposium, Proceedings, Aug. 6, 2012, Proceedings published on Aug. 22, 2012.†

\* cited by examiner
† cited by third party

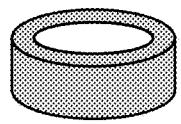
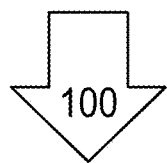
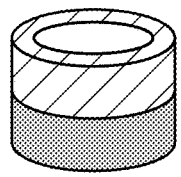
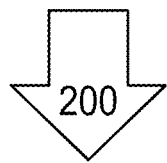
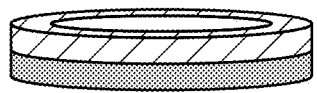
FIG. 12

METHODS FOR PRODUCING FORGED PRODUCTS AND OTHER WORKED PRODUCTS

CROSS-REFERENCE TO RELATED APPLICATIONS

This patent application is a continuation of U.S. patent application Ser. No. 14/327,218, filed Jul. 9, 2014, which claims priority to U.S. Provisional Patent Application No. 61/844,744, filed Jul. 10, 2013, and claims priority to U.S. Provisional Patent Application No. 61/845,260, filed Jul. 11, 2013, and claims priority to U.S. Provisional Patent Application No. 61/895,046, filed Oct. 24, 2013, and claims priority to U.S. Provisional Patent Application No. 61/913,077, filed Dec. 6, 2013, and claims priority to U.S. Provisional Patent Application No. 61/955,027, filed Mar. 18, 2014. Each of these applications is incorporated by reference in their entirety herein.

BACKGROUND

Metal products may be formed into shapes via forging operations. To forge metal products, several successive dies (flat dies and/or differently shaped dies) may be used for each part, with the flat die or the die cavity in a first of the dies being designed to deform the forging stock to a first shape defined by the configuration of that particular die, and with the next die being shaped to perform a next successive step in the forging deformation of the stock, and so on, until the final die ultimately gives the forged part a fully deformed shape. See, U.S. Pat. No. 4,055,975.

SUMMARY

Broadly, the present patent application relates to improved methods for producing worked metal products (e.g., forged metal products; other types of hot worked and/or cold worked metal products).

In one embodiment, a method includes using additive manufacturing to produce a metal shaped-preform. After the using step, the metal shaped-preform may be forged into a final forged product. In one embodiment, the forging step comprises a single die forging step. In one embodiment, the metal preform comprises at least one of titanium, aluminum, nickel, steel, and stainless steel. In one embodiment, the metal shaped-preform may be a titanium alloy. For example, the metal shaped-preform may comprise a Ti-6Al-4V alloy. In another embodiment, the metal shaped-preform may be an aluminum alloy. In yet another embodiment, the metal shaped-preform may be a nickel alloy. In yet another embodiment, the metal shaped-preform may be one of a steel and a stainless steel. In another embodiment, the metal shaped-preform may be a metal matrix composite. In yet another embodiment, the metal shaped-preform may comprise titanium aluminide. For example, in one embodiment, the titanium alloy may include at least 48 wt. % Ti and at least one titanium aluminide phase, wherein the at least one titanium aluminide phase is selected from the group consisting of $Ti_3Al$, TiAl and combinations thereof. In another embodiment, the titanium alloy includes at least 49 wt. % Ti. In yet another embodiment, the titanium alloy includes at least 50 wt. % Ti. In another embodiment, the titanium alloy includes 5-49 wt. % aluminum. In yet another embodiment, the titanium alloy includes 30-49 wt. % aluminum, and the titanium alloy comprises at least some TiAl. In yet another embodiment, the titanium alloy includes 5-30 wt. % aluminum, and the titanium alloy comprises at least some $Ti_3Al$.

The forging step may comprise heating the metal shaped-preform to a stock temperature, and contacting the metal shaped-preform with a forging die. In one embodiment, when the contacting step is initiated, the forging die may be a temperature that is at least 10° F. lower than the stock temperature. In another embodiment, when the contacting step is initiated, the forging die is a temperature that is at least 25° F. lower than the stock temperature. In yet another embodiment, when the contacting step is initiated, the forging die is a temperature that is at least 50° F. lower than the stock temperature. In another embodiment, when the contacting step is initiated, the forging die is a temperature that is at least 100° F. lower than the stock temperature. In yet another embodiment, when the contacting step is initiated, the forging die is a temperature that is at least 200° F. lower than the stock temperature.

In one aspect, the final forged product is a component for an engine. In one embodiment, the final forged product is a blade for a jet engine. In another embodiment, as described below, the final forged product is an engine containment ring.

In another aspect, a method may comprise using additive manufacturing to produce a metal shaped-preform, and concomitant to, or after the using step, working the metal shaped-preform into a final worked product via at least one of: (i) rolling, (ii) ring rolling, (iii) ring forging, (iv) shaped rolling, (v) extruding, and (vi) combinations thereof. In one embodiment, the working is rolling. In another embodiment, the working is ring rolling. In yet another embodiment, the working is ring forging. In another embodiment, the working is shaped rolling. In yet another embodiment, the working is extruding.

When the metal shaped-preform comprises a Ti-6Al-4V alloy, the forging step may comprise heating the metal shaped-preform to a stock temperature, and contacting the metal shaped-preform with a forging die. In this regard, the contacting step may comprise deforming the metal shaped-preform via the forging die. In one embodiment, the contacting step comprises deforming the metal shaped-preform via the forging die to realize a true strain of from 0.05 to 1.10 in the metal shaped-preform. In another embodiment, the contacting step comprises deforming the metal shaped-preform via the forging die to realize a true strain of at least 0.10 in the metal shaped-preform. In yet another embodiment, the contacting step comprises deforming the metal shaped-preform via the forging die to realize a true strain of at least 0.20 in the metal shaped-preform. In another embodiment, the contacting step comprises deforming the metal shaped-preform via the forging die to realize a true strain of at least 0.25 in the metal shaped-preform. In yet another embodiment, the contacting step comprises deforming the metal shaped-preform via the forging die to realize a true strain of at least 0.30 in the metal shaped-preform. In another embodiment, the contacting step comprises deforming the metal shaped-preform via the forging die to realize a true strain of at least 0.35 in the metal shaped-preform. In another embodiment, the contacting step comprises deforming the metal shaped-preform via the forging die to realize a true strain of not greater than 1.00 in the metal shaped-preform. In yet another embodiment, the contacting step comprises deforming the metal shaped-preform via the forging die to realize a true strain of not greater than 0.90 in the metal shaped-preform. In another embodiment, the contacting step comprises deforming the metal shaped-preform via the forging die to realize a true strain of not greater than 0.80 in the metal shaped-preform. In yet another embodiment, the contacting step comprises deforming the metal shaped-preform via the forging die to realize a true strain of not greater than 0.70 in the metal shaped-preform. In another embodiment, the contacting step comprises deforming the metal shaped-preform via the forging die to realize a true strain of not greater than 0.60 in the metal shaped-preform. In yet another embodiment, the contacting step comprises deforming the metal shaped-preform via the forging die to realize a true strain of not greater than 0.50 in the metal shaped-preform. In another embodiment, the contacting step comprises deforming the metal shaped-preform via the forging die to realize a true strain of not greater than 0.45 in the metal shaped-preform. As mentioned above, the forging step may comprise heating the metal shaped-preform to a stock temperature.

In one aspect, the forging step may comprise heating the metal-shaped preform to a stock temperature. In one approach, the metal shaped preform is heated to a stock temperature of from 850° C. to 978° C. In one embodiment, the metal shaped preform is heated to a stock temperature of at least 900° C. In another embodiment, the metal shaped preform is heated to a stock temperature of at least 950° C. In yet another embodiment, the metal shaped preform is heated to a stock temperature of at least 960° C. In another embodiment, the metal shaped preform is heated to a stock temperature of not greater than 975° C. In yet another embodiment, the metal shaped preform is heated to a stock temperature of not greater than 973° C.

In one aspect, the step of using additive manufacturing to produce a metal shaped-preform may comprise adding material, via additive manufacturing, to a building substrate thereby producing the metal shaped-preform. In one embodiment, the material is a first material having a first strength and wherein the building substrate is comprised of a second material having a second strength. The first material may have a first fatigue property and the second material may have a second fatigue property. For example, a layer of a first material having low strength and high toughness could be added, via additive manufacturing, to a building substrate comprised of a second material having high strength and low toughness, thereby producing a metal-shaped preform useful, for example, in ballistic applications.

In one embodiment, the building substrate comprises a first ring of a first material, and the using step comprises adding a second material, via additive manufacturing, to the first ring thereby forming a second ring, wherein the second ring is integral with the first ring.

In another aspect, the method may include, after the forging step, annealing the final forged product. In one embodiment, when the metal shaped-preform comprises a Ti-6Al-4V alloy, the annealing step may comprise heating the final forged product to a temperature of from about 640° C. to about 816° C. In another embodiment, when the metal shaped-preform comprises a Ti-6Al-4V alloy, the annealing step may comprise heating the final forged product to a temperature of from about 670° C. to about 750° C. In yet another embodiment, when the metal shaped-preform comprises a Ti-6Al-4V alloy, the annealing step may comprise heating the final forged product to a temperature of from about 700° C. to about 740° C. In another embodiment, when the metal shaped-preform comprises a Ti-6Al-4V alloy, the annealing step may comprise heating the final forged product to a temperature of about 732° C.

BRIEF DESCRIPTION OF THE DRAWINGS

FIG. 12 is a schematic illustration of one embodiment of a method for producing a final ring-shaped product.

DETAILED DESCRIPTION

Reference will now be made in detail to the accompanying drawings, which at least assist in illustrating various pertinent embodiments of the new technology provided for by the present disclosure.

Figure 1:
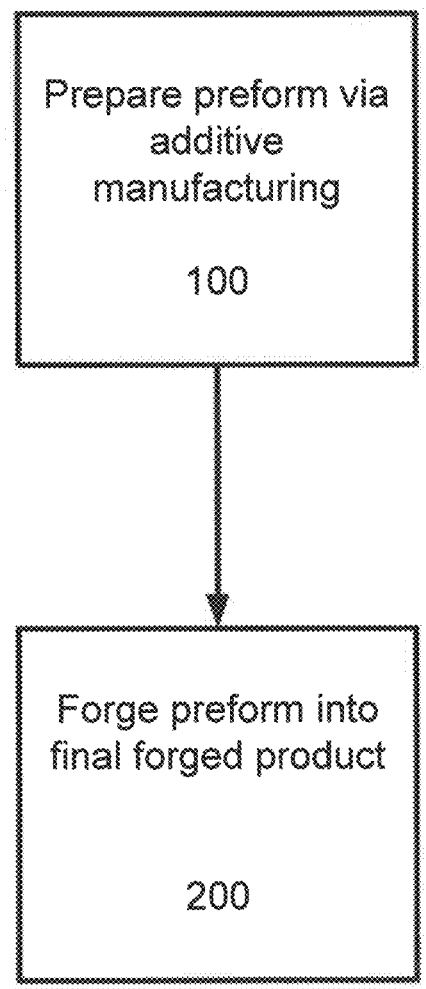
FIG. 1 is a schematic illustration of one embodiment of a method of producing a final forged product.

One embodiment of the new method for producing forged metal products is illustrated in FIG. 1. In the illustrated embodiment, the method includes a step of preparing (100) a metal shaped-preform via additive manufacturing, followed by forging (200) the metal shaped-preform into a final forged product (e.g., a net-shape product or near net-shape product). After the forging step (200), the final forged product may require no additional machining or other processing steps, thus facilitating a lower total cost of manufacturing. Furthermore, the final forged product may realize improved properties (e.g., relative to a pure additively manufactured component).

The additive manufacturing step (100) prepares the metal shaped-preform. Additive manufacturing, or 3-D printing, is a process where layers of a material are deposited one after another using digital printing techniques. Thus, precisely designed products can be produced. The metal shaped-preform produced by the additive manufacturing step (100) may be made from any metal suited for both additive manufacturing and forging, including, for example metals or alloys of titanium, aluminum, nickel (e.g., INCONEL), steel, and stainless steel, among others. An alloy of titanium is an alloy having titanium as the predominant alloying element. An alloy of aluminum is an alloy having aluminum as the predominant alloying element. An alloy of nickel is an alloy having nickel as the predominant alloying element. An alloy of steel is an alloy having iron as the predominant alloying element, and at least some carbon. An alloy of stainless steel is an alloy having iron as the predominant alloying element, at least some carbon, and at least some chromium. In one embodiment, the metal shaped-preform is an intermediate product in the form of a precursor to a blade for a jet engine.

Still referring to FIG. 1, once the metal shaped-preform is formed, the metal shaped-preform is forged (200). In one embodiment, the forging step (200) uses a single blocker to die forge the metal shaped-preform into the final forged product. By forging (200) the metal shaped-preform, the final forged product may realize improved properties, such as improved porosity (e.g., less porosity), improved surface roughness (e.g., less surface roughness, i.e., a smoother surface), and/or better mechanical properties (e.g., improved surface hardness), among others.

Figure 2:
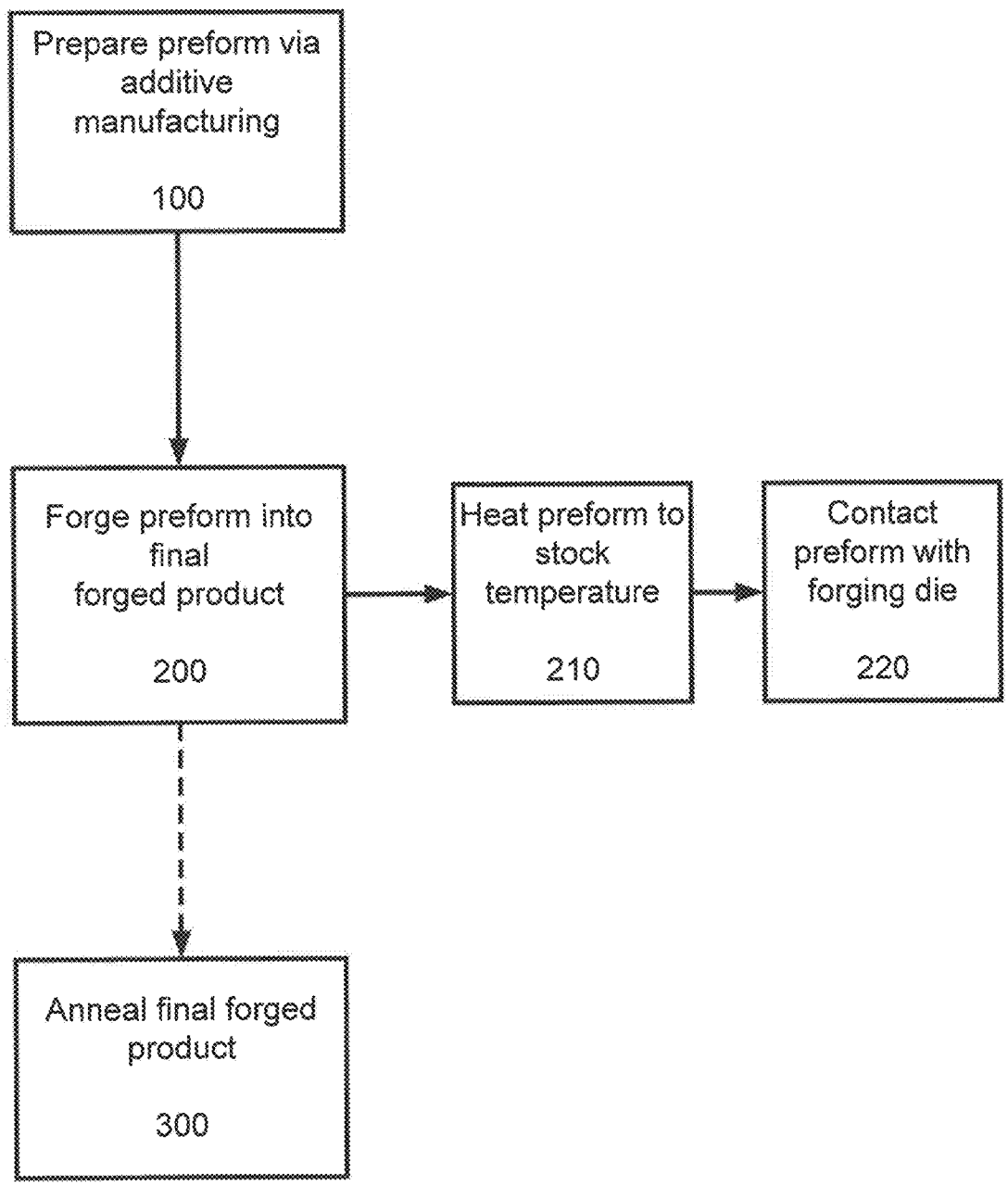
FIG. 2 is a schematic illustration of one embodiment of a method of producing a final forged product, wherein the method includes an optional annealing step.

Referring now to FIG. 2, in one embodiment, during the forging step (200), the dies and/or tooling of the forging process is at a lower temperature than the metal-shaped preform. In this regard, the forging step may include heating the metal shaped-preform to a stock temperature (the target temperature of the preform prior to the forging) (210), and contacting the metal shaped-preform with a forging die (220). In one embodiment, when the contacting step (220) is initiated, the forging die is a temperature that is at least 10° F. lower than the stock temperature. In another embodiment, when the contacting step (220) is initiated, the forging die is a temperature that is at least 25° F. lower than the stock temperature. In yet another embodiment, when the contacting step (220) is initiated, the forging die is a temperature that is at least 50° F. lower than the stock temperature. In another embodiment, when the contacting step (220) is initiated, the forging die is a temperature that is at least 100° F. lower than the stock temperature. In yet another embodiment, when the contacting step (220) is initiated, the forging die is a temperature that is at least 200° F. lower than the stock temperature. In another embodiment, when the contacting step (220) is initiated, the forging die is a temperature that is at least 300° F. lower than the stock temperature. In yet another embodiment, when the contacting step (220) is initiated, the forging die is a temperature that is at least 400° F. lower than the stock temperature. In another embodiment, when the contacting step (220) is initiated, the forging die is a temperature that is at least 500° F. lower than the stock temperature.

In one aspect, after the forging step (200) the final forged product may optionally be annealed (300). The annealing step (300) may facilitate the relieving of residual stress in the metal-shaped preform due to the forging step (200). In one approach, the metal-shaped preform comprises a Ti-6Al-4V alloy and the annealing step (300) may comprise heating the final forged product to a temperature of from about 640° C. (1184° F.) to about 816° C. (1500° F.) and for a time of from about 0.5 hour to about 5 hours. In one embodiment, the annealing step (300) may comprise heating the final forged product to a temperature of at least about 640° C. (1184° F.). In another embodiment, the annealing step (300) may comprise heating the final forged product to a temperature of at least about 670° C. (1238° F.). In yet another embodiment, the annealing step (300) may comprise heating the final forged product to a temperature of at least about 700° C. (1292° F.). In another embodiment, the annealing step (300) may comprise heating the final forged product to a temperature of not greater than about 760° C. (1400° F.). In yet another embodiment, the annealing step (300) may comprise heating the final forged product to a temperature of not greater than about 750° C. (1382° F.). In another embodiment, the annealing step (300) may comprise heating the final forged product to a temperature of not greater than about 740° C. (1364° F.). In yet another embodiment, the time is at least about 1 hour. In another embodiment, the time is at least about 2 hours. In yet another embodiment, the time is not greater than about 4 hours. In another embodiment, he time is not greater than about 3 hours. In yet another embodiment, the annealing step (300) may comprise heating the final forged product to a temperature of about 732° C. (1350° F.) and for a time of about 2 hours.

The contacting step (220) may comprise applying a sufficient force to the metal shaped-preform via the forging die to realize a pre-selected amount of true strain in the metal shaped-preform. In one embodiment, the applying a sufficient force step comprises deforming the metal shaped-preform via the forging die. As used herein "true strain" ($\varepsilon_{true}$) is given by the formula:

$$\varepsilon_{true} = \ln(L/L_0)$$

Where $L_0$ is initial length of the material and L is the final length of the material. In one embodiment, the contacting step (220) may comprise applying sufficient force to the metal shaped-preform via the forging die to realize a true strain of from about 0.05 to about 1.10 in the metal shaped-preform. In another embodiment, the contacting step (220) may comprise applying sufficient force to the metal shaped-preform via the forging die to realize a true strain of at least 0.10 in the metal shaped-preform. In another embodiment, the contacting step (220) may comprise applying sufficient force to the metal shaped-preform via the forging die to realize a true strain of at least 0.20 in the metal shaped-preform. In yet another embodiment, the contacting step (220) may comprise applying sufficient force to the metal shaped-preform via the forging die to realize a true strain of at least 0.25 in the metal shaped-preform. In another embodiment, the contacting step (220) may comprise applying sufficient force to the metal shaped-preform via the forging die to realize a true strain of at least 0.30 in the metal shaped-preform. In yet another embodiment, the contacting step (220) may comprise applying sufficient force to the metal shaped-preform via the forging die to realize a true strain of at least 0.35 in the metal shaped-preform. In another embodiment, the contacting step (220) may comprise applying sufficient force to the metal shaped-preform via the forging die to realize a true strain of not greater than 1.00 in the metal shaped-preform. In yet another embodiment, the contacting step (220) may comprise applying sufficient force to the metal shaped-preform via the forging die to realize a true strain of not greater than 0.90 in the metal shaped-preform. In another embodiment, the contacting step (220) may comprise applying sufficient force to the metal shaped-preform via the forging die to realize a true strain of not greater than 0.80 in the metal shaped-preform. In yet another embodiment, the contacting step (220) may comprise applying sufficient force to the metal shaped-preform via the forging die to realize a true strain of not greater than 0.70 in the metal shaped-preform. In another embodiment, the contacting step (220) may comprise applying sufficient force to the metal shaped-preform via the forging die to realize a true strain of not greater than 0.60 in the metal shaped-preform. In yet another embodiment, the contacting step (220) may comprise applying sufficient force to the metal shaped-preform via the forging die to realize a true strain of not greater than 0.50 in the metal shaped-preform. In another embodiment, the contacting step (220) may comprise applying sufficient force to the metal shaped-preform via the forging die to realize a true strain of not greater than 0.45 in the metal shaped-preform. In yet another embodiment, the contacting step (220) may comprise applying sufficient force to the metal shaped-preform via the forging die to realize a true strain of about 0.40 in the metal shaped-preform.

In one embodiment, the metal shaped-preform is a low ductility material, such as a metal matrix composite or an intermetallic material. In one embodiment, the metal shaped-preform is titanium aluminide. Using the new processes disclosed herein may facilitate more economical production of final forged products from such low ductility materials. For instance, the low ductility materials may be forged using dies and/or tooling that are at a lower temperature than the low ductility material. Thus, in one embodiment, the forging is absent of isothermal forging (i.e., the forging process does not include isothermal forging), and thus can include any of the stock temperature versus die temperature differentials noted in the above-paragraph.

In one aspect, the metal shaped preform is a titanium (Ti) alloy, and thus includes titanium as the predominant alloying element. In one embodiment, a titanium alloy includes at least 48 wt. % Ti. In another embodiment, a titanium alloy includes at least 49 wt. % Ti. In yet another embodiment, a titanium alloy includes at least 50 wt. % Ti. In one embodiment, the titanium alloy comprises one or more titanium aluminide phases. In one embodiment, the titanium aluminide phase(s) is/are one or more of $Ti_3Al$ and TiAl. When titanium aluminides are present, the titanium alloy may include 5-49 wt. % aluminum. In one embodiment, the titanium aluminide phase(s) comprise TiAl. In one embodiment, the titanium alloy includes 30-49 wt. % aluminum, and the titanium alloy comprises at least some TiAl. In one embodiment, the titanium aluminide phase(s) comprises $Ti_3Al$. In one embodiment, the titanium alloy includes 5-30 wt. % aluminum, and the titanium alloy comprises at least some $Ti_3Al$. In one embodiment, the titanium alloy comprises aluminum and vanadium.

In one embodiment, the metal shaped preform comprises a Ti-6Al-4V alloy (a titanium alloy having about 6 wt. % aluminum and about 4 wt. % vanadium). In this regard, the Ti-6Al-4V preforms may be heated to a stock temperature of from about 850° C. (1562° F.) to about 978° C. (1792° F.). In one embodiment, the Ti-6Al-4V preforms may be heated to a stock temperature of at least 900° C. (1652° F.). In another embodiment, the Ti-6Al-4V preforms may be heated to a stock temperature of at least 925° C. (1697° F.). In another embodiment, the Ti-6Al-4V preforms may be heated to a stock temperature of at least 950° C. (1742° F.). In yet another embodiment, the Ti-6Al-4V preforms may be heated to a stock temperature of at least 960° C. (1760° F.). In another embodiment, the Ti-6Al-4V preforms may be heated to a stock temperature of not greater than 975° C. (1787° F.). In yet another embodiment, the Ti-6Al-4V preforms may be heated to a stock temperature of not greater than 973° C. (1783° F.).

The final forged product may be used in the aerospace, aviation, or medical industries, for example. The final forged product could be, for example, a turbine or blade. In one embodiment, the final forged product is a blade for a jet engine.

As mentioned above, after the additive manufacturing step (100), the metal shaped-preform may be forged (200) to create a final forged product. In other embodiments, after the additive manufacturing step (100), the metal shaped-preform may be processed via other forms of working (e.g., hot working) to create a final worked product. For instance, the working of the metal shaped-preform may also or alternatively include rolling, ring rolling, ring forging, shaped rolling, and/or extruding to create the final worked product. In some embodiments, the final worked product may realize improved properties, such as improved porosity (e.g., less porosity), improved surface roughness (e.g., less surface roughness, i.e., a smoother surface), and/or better mechanical properties (e.g., improved surface hardness), among others. In some embodiments, the final worked product may realize a predetermined shape. In some embodiments, the metal shaped-preform may be ring rolled, ring forged and/or extruded (e.g., forced through a die) to create a hollow final worked product. In some embodiments, the metal shaped-preform may be rolled to produce a final worked product that realizes improved porosity. In some embodiments, the metal shaped-preform may be shape rolled to produce a final worked product that realizes a predetermined shape (e.g., a curve having a specified radius).

As used herein, "ring rolling" means the process of rolling a ring of smaller diameter (e.g., a first ring having a first diameter) into a ring of larger diameter (e.g, a second ring having a second diameter, wherein the second diameter is larger than the first diameter), optionally with a modified cross section (e.g., a cross sectional area of the second ring is different than a cross sectional area of the first ring) by the use of two rotating rollers, one placed in the inside diameter of the ring and the second directly opposite the first on the outside diameter of the ring. As used herein, "ring forging" means the process of forging a ring of smaller diameter (e.g., a first ring having a first diameter) into a ring of larger diameter (e.g, a second ring having a second diameter, wherein the second diameter is larger than the first diameter), optionally with a modified cross section (e.g., a cross sectional area of the second ring is different than a cross sectional area of the first ring) by squeezing the ring between two tools or dies, one on the inside diameter and one directly opposite on the outside diameter of the ring. As used herein, "shaped rolling" means the process of shaping or forming by working the piece (i.e., the metal shaped-preform) between two or more rollers, which may or may not be profiled, to impart a curvature or shape to the work piece (i.e., the metal shaped-preform).

Figure 5:
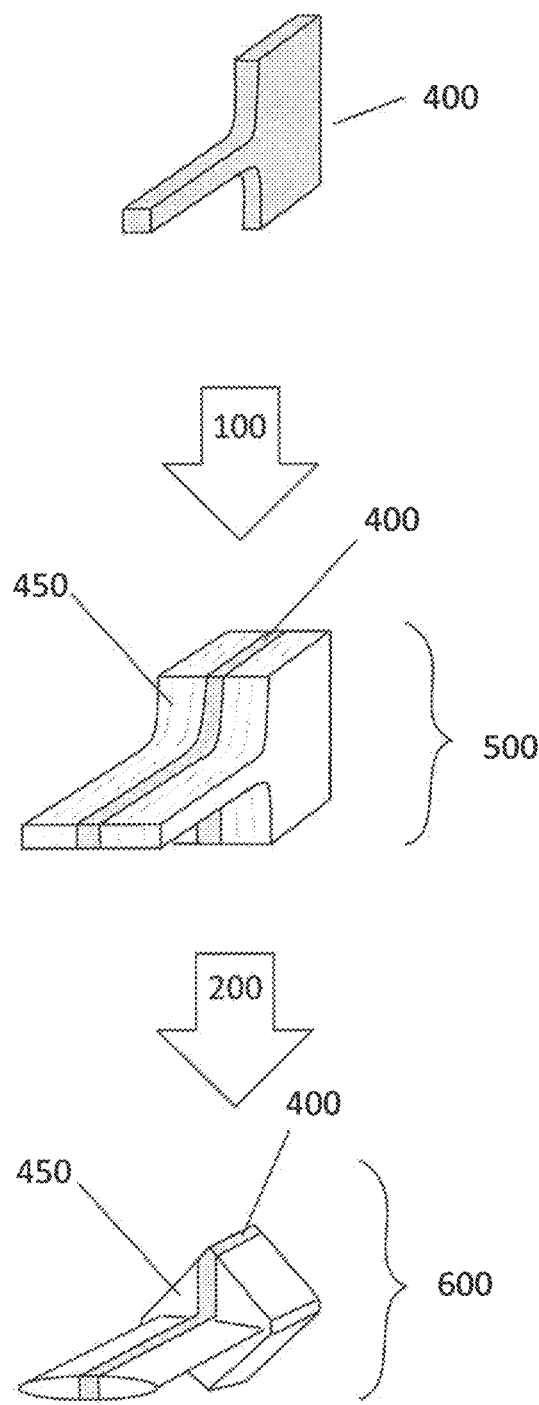
FIG. 5 is a schematic illustration of one embodiment of a method of producing a final forged product, wherein the final forged product includes an integral building substrate.

The step of preparing the metal shaped-preform via additive manufacturing (100) may include incorporating a building substrate into the metal shaped-preform. Referring now to FIG. 5, one embodiment of incorporating a building substrate (400) into the metal shaped-preform (500) is shown. In the illustrated embodiment, material (450) is added to a building substrate (400) via additive manufacturing (100) to produce the metal shaped-preform (500). As used herein, "building substrate" and the like means a solid material which may be incorporated into a metal shaped-preform. The metal shaped-preform (500), which includes the building substrate (400), may be forged (200) into a final forged product (600). Thus, the final forged product (600) may include the building substrate (400) as an integral piece.

As mentioned above, a final forged product may realize an amount (e.g., a pre-selected amount) of true strain due to the contacting step 220. In some embodiments, the strain realized by the final forged product may be non-uniform throughout the final forged product due to, for example, the shape of the forging dies and/or the shape of the metal shaped-preform. Thus, the final forged product may realize areas of low and/or high strain. Accordingly, the building substrate may be located in a predetermined area of the metal shaped-preform such that after the forging, the building substrate is located in a predetermined area of low strain of the final forged product. An area of low strain may be predetermined based on predictive modeling or empirical testing.

Figure 6:
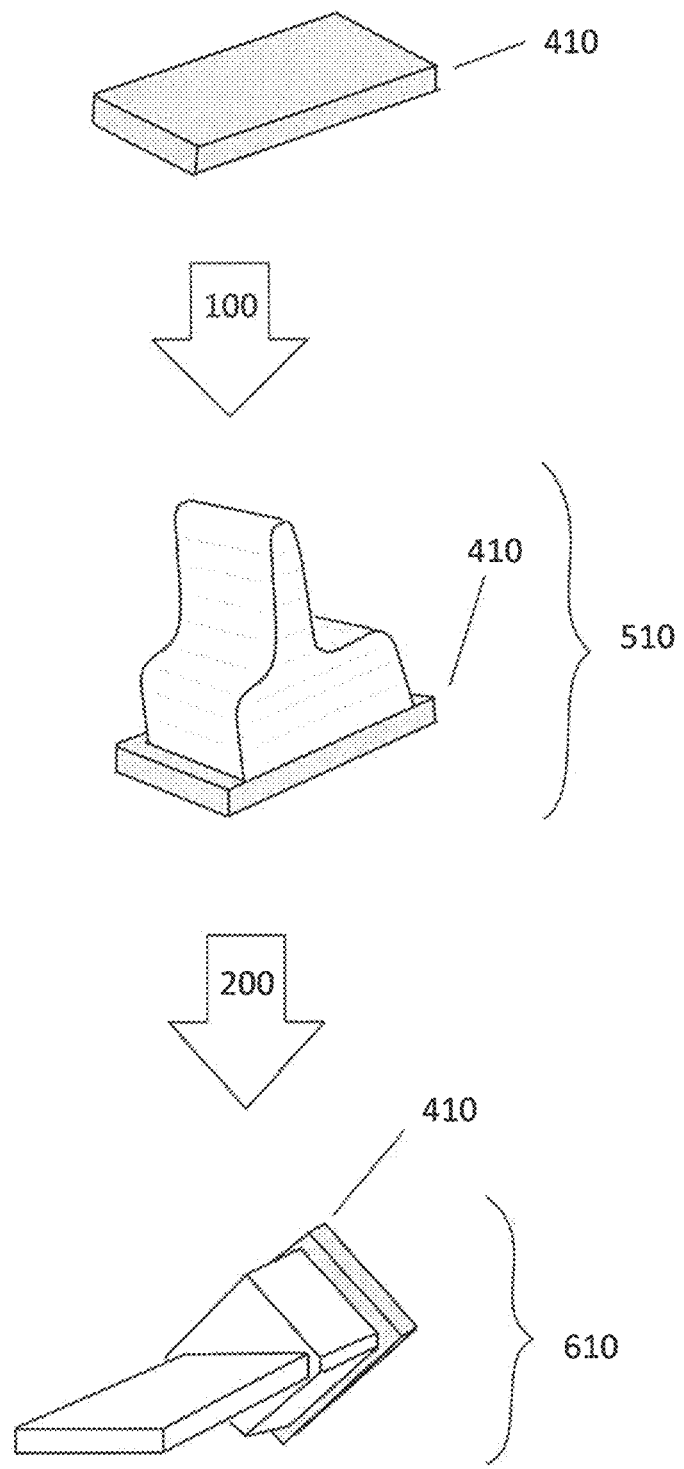
FIG. 6 is a schematic illustration of another embodiment of a method of producing a final forged product, wherein the final forged product includes an integral building substrate.

Referring now to FIG. 6, another embodiment of incorporating a building substrate (410) into a metal shaped-preform (510) is shown. In the illustrated embodiment, material is added to the building substrate (410) via additive manufacturing (100) to produce the metal shaped-preform (510). The metal shaped-preform (510) may be forged (200)

into a final forged product (610). The final forged product (610) includes the building substrate (410) as an integral piece.

The building substrate may have a predetermined shape and/or predetermined mechanical properties (e.g., strength, toughness to name a few). In one embodiment, the building substrate may be a pre-wrought base plate. In one embodiment, the shape of the building substrate may be predetermined based on the shape of the area of low strain. In one embodiment, the mechanical properties of the building substrate may be predetermined based on the average true strain realized by the metal shaped-preform and/or the true strain realized within the area of low strain. In one embodiment, two or more building substrates may be incorporated into a metal-shaped preform. In one embodiment, the building substrate comprises a pre-wrought base plate.

The building substrate may be made from any metal suited for both additive manufacturing and forging, including, for example metals or alloys of titanium, aluminum, nickel (e.g., INCONEL), steel, and stainless steel, among others. In one embodiment, the building substrate is made of the same material(s) as the rest of the metal-shaped preform. In one embodiment, the material added to the metal shaped preform may be a first material, whereas the building substrate may be made of a second material. In one embodiment, the first material may have a first strength and the second material may have a second strength. In one embodiment, the first material may have a first fatigue property and the second material may have a second fatigue property. In one example, the building substrate may be a first ring of a first material. A second material may be added, via additive manufacturing, to the ring thereby forming a second ring of the second material, integral with the first ring. Thus a ring-shaped metal shaped-preform comprising two different materials may be produced. The ring-shaped metal shaped-preform may then be forged into a ring-shaped final forged product comprising two different materials. In one embodiment, one or more engine containment rings (e.g., one or more aerospace engine containment rings) may be formed by the method described above. For example the building substrate may comprise a first ring of a material which realizes high toughness. A second ring of a second material which realizes high strength may be added, via additive manufacturing, to the first ring thereby forming a metal shaped-preform. The metal shaped-preform may then be forged into an engine containment ring having an inner ring of high toughness and outer ring of high strength.

Example 1—Ti-6Al-4V

Figure 3:
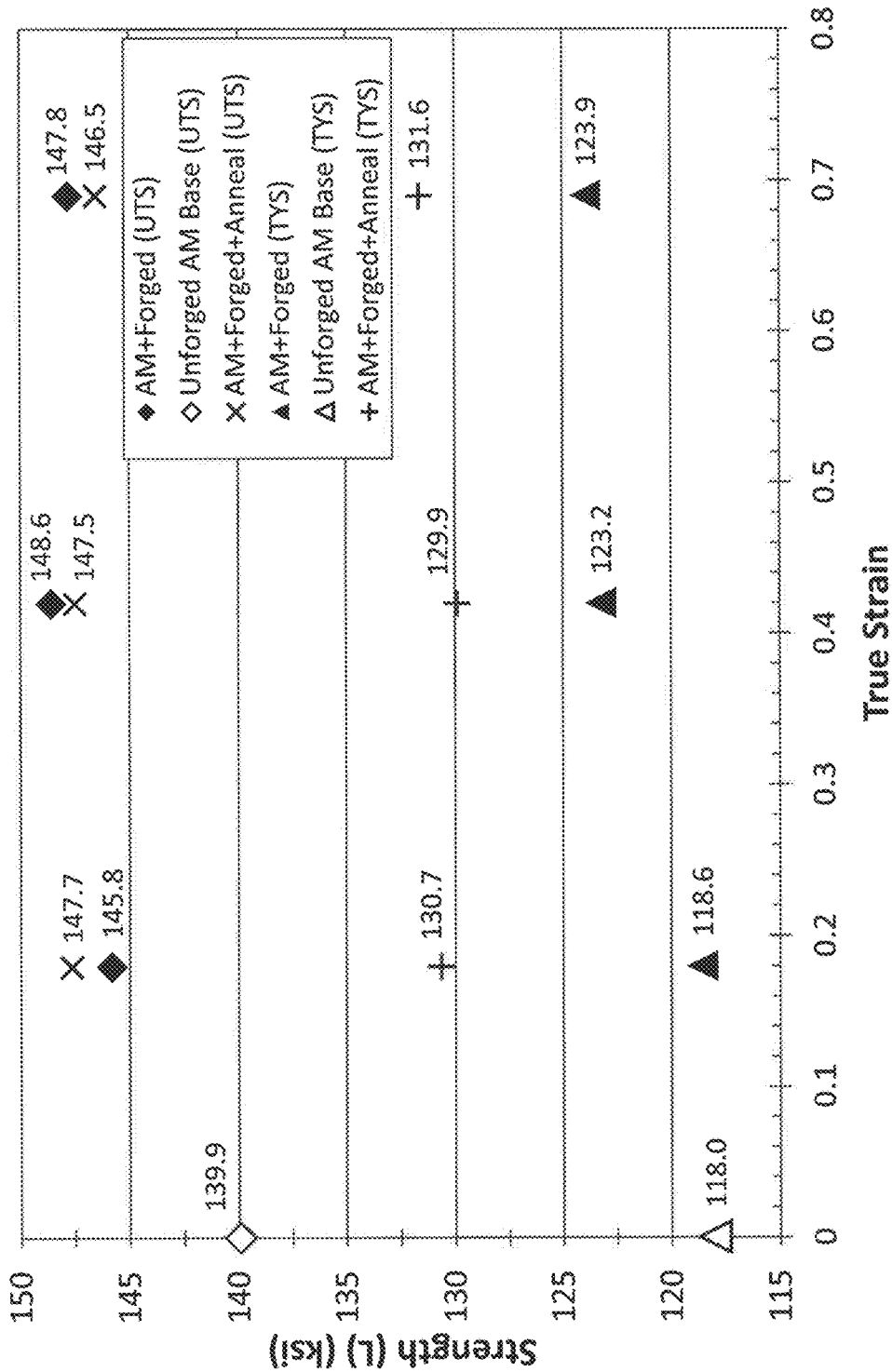
FIGS. 3-4 are charts illustrating data of Example 1.
Figure 4:
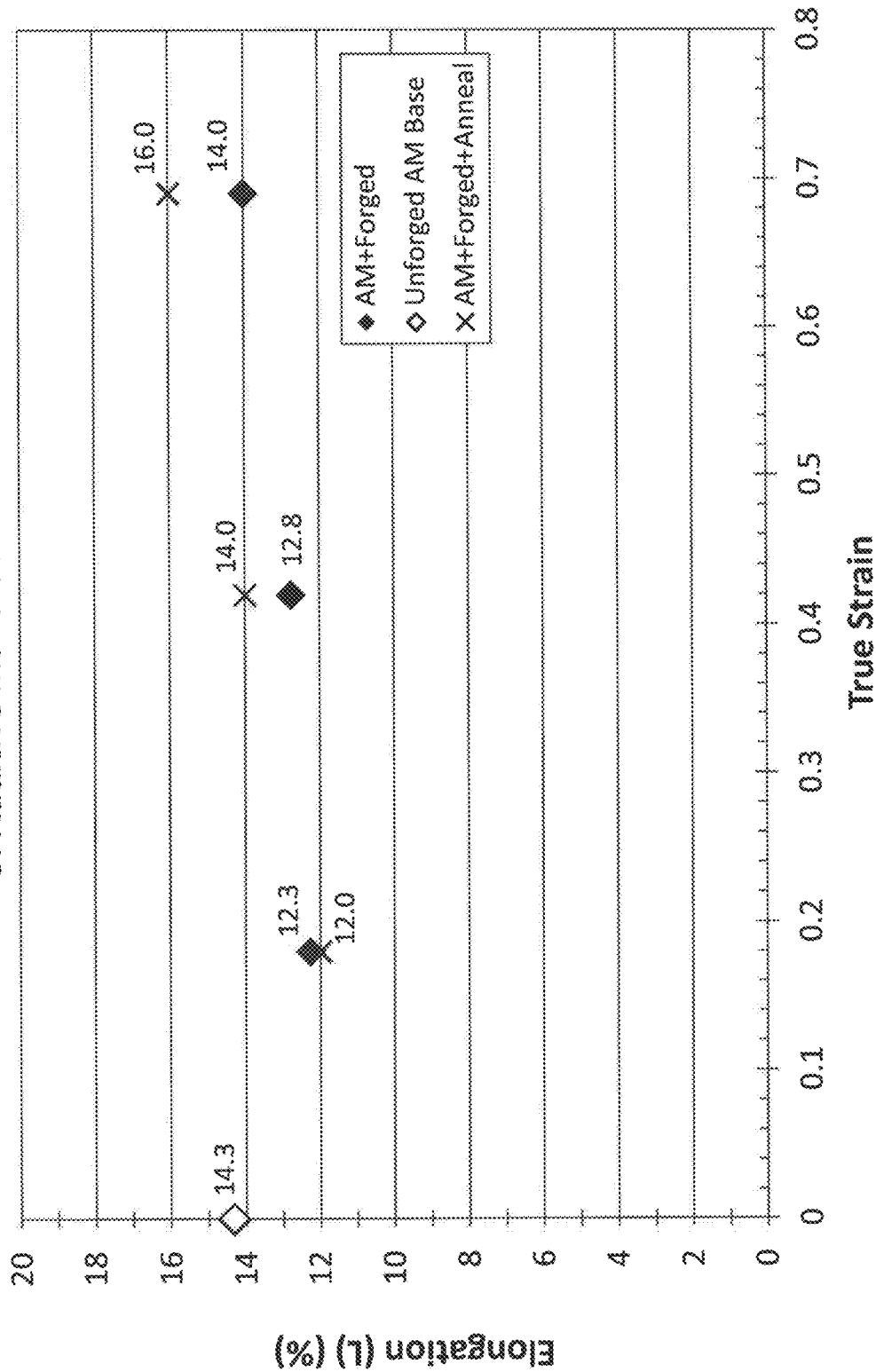

Several Ti-6Al-4V preforms are produced via additive manufacturing. Specifically cylindrical Ti-6Al-4V preforms were produced via an EOSINT M 280 Direct Metal Laser Sintering (DMLS) additive manufacturing system, available from EOS GmbH (Robert-Stirling-Ring 1, 82152 Krailling/Munich, Germany). The Ti-6Al-4V preforms were produced in accordance with the manufacturer's standard recommended operating conditions for titanium. The preforms were then heated to a stock temperature of about 958° C. (1756° F.) or about 972° C. (1782° F.). Next, some of the cylindrical preforms were forged under various amounts of true strain and using a die temperature of about 390° C.-400° C. (734° F.-752° F.) to produce cylindrical final forged products. The true strain was applied to the cylindrical preforms in a direction parallel to the axis of the cylinders. The remaining preforms were left unforged. Some of the final forged products were then annealed at a temperature of about 732° C. (1350° F.) for approximately two hours to produce annealed final forged products. Mechanical properties of the unforged preforms, the final forged products, and the annealed final forged products were then tested, including tensile yield strength (TYS), ultimate tensile strength (UTS) and elongation, all in the L direction, the results of which are shown in FIGS. 3-4. For each level of strain, several samples were tested and the results were averaged. Mechanical properties, including TYS, UTS, and elongation were tested in accordance with ASTM E8.

As shown, the forged Ti-6Al-4V products achieved improved properties over the unforged Ti-6Al-4V preforms. Specifically, and with reference to FIG. 3, the forged Ti-6Al-4V products achieved improved ultimate tensile strength (UTS) over the unforged Ti-6Al-4V preforms. For example, the unforged Ti-6Al-4V preforms achieved a UTS of about 140 ksi. In contrast, the forged Ti-6Al-4V products achieved improved ultimate tensile strength, realizing a UTS of about 149 ksi after being forged to a true strain of about 0.4. Furthermore, and as shown in FIG. 3, the forged Ti-6Al-4V products achieved improved tensile yield strength (TYS) over the unforged Ti-6Al-4V preforms. For example, the unforged Ti-6Al-4V preforms achieved a TYS of about 118 ksi. In contrast, the forged Ti-6Al-4V products achieved improved tensile yield strength, realizing a TYS of about 123 ksi after being forged to a true strain of about 0.4. As shown in FIG. 4, the forged Ti-6Al-4V products achieved good elongation, all achieving an elongation of above 12% after being forged.

Furthermore, the annealed final forged products achieved improved properties over the final forged products which were not annealed. Specifically, and with reference to FIG. 3, the annealed final forged products achieved improved tensile yield strength (TYS) over the non-annealed final forged products. For example the annealed final forged products which were forged to a true strain of about 0.2 achieved a TYS approximately 10% higher than the final forged products which were not annealed. Furthermore, and as shown in FIG. 3, the annealed final forged products achieved similar ultimate tensile strength (UTS) to the non-annealed final forged products. Thus, annealing the final forged products increased TYS without sacrificing UTS. As shown in FIG. 4, the annealed final forged products achieved improved elongation compared to the non-annealed final forged products.

Figure 7:
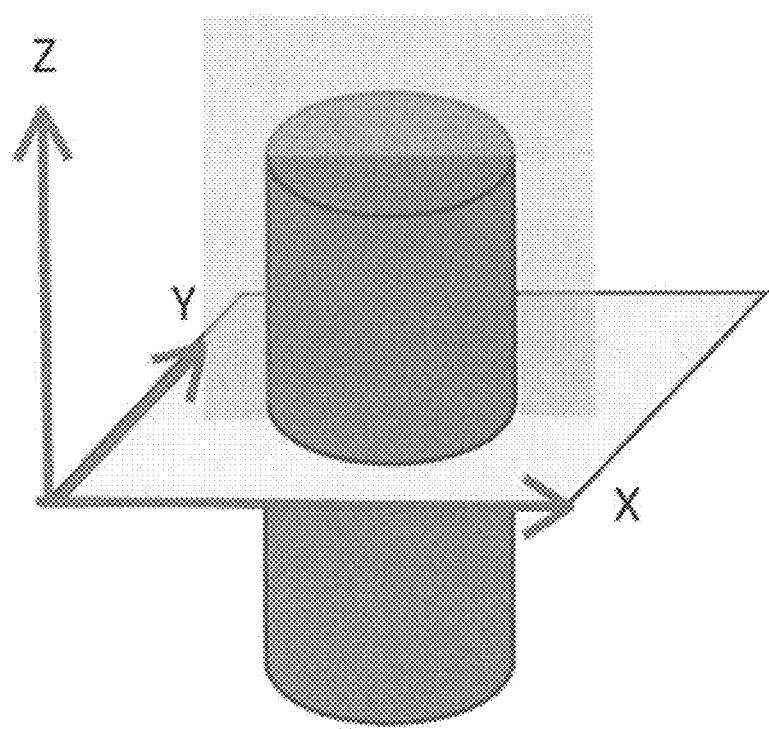
FIG. 7 is an illustration showing the transverse orientation and longitudinal orientations of a cylindrical preform.
Figure 8:
FIG. 8 is a micrograph of one embodiment of an as-built Ti-6Al-4V metal shaped-preform, taken in the transverse direction.
Figure 9:
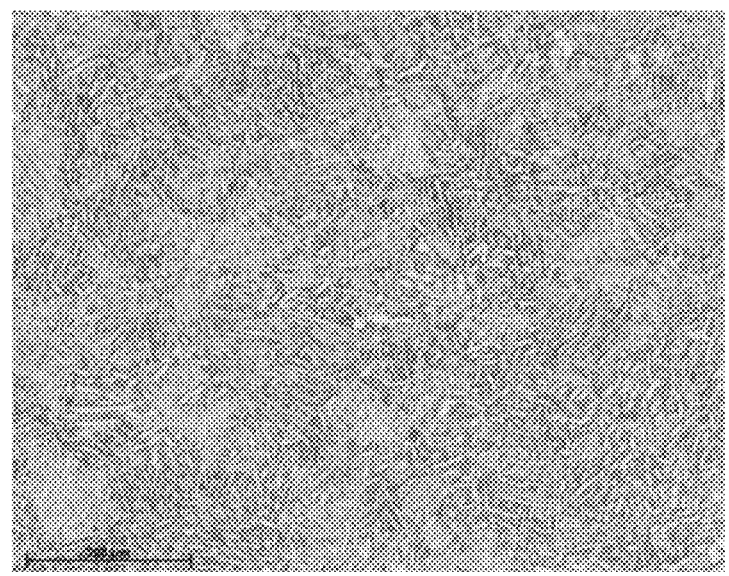
FIG. 9 is a micrograph of one embodiment of a preheated Ti-6Al-4V metal shaped-preform, taken in the transverse direction.
Figure 10:
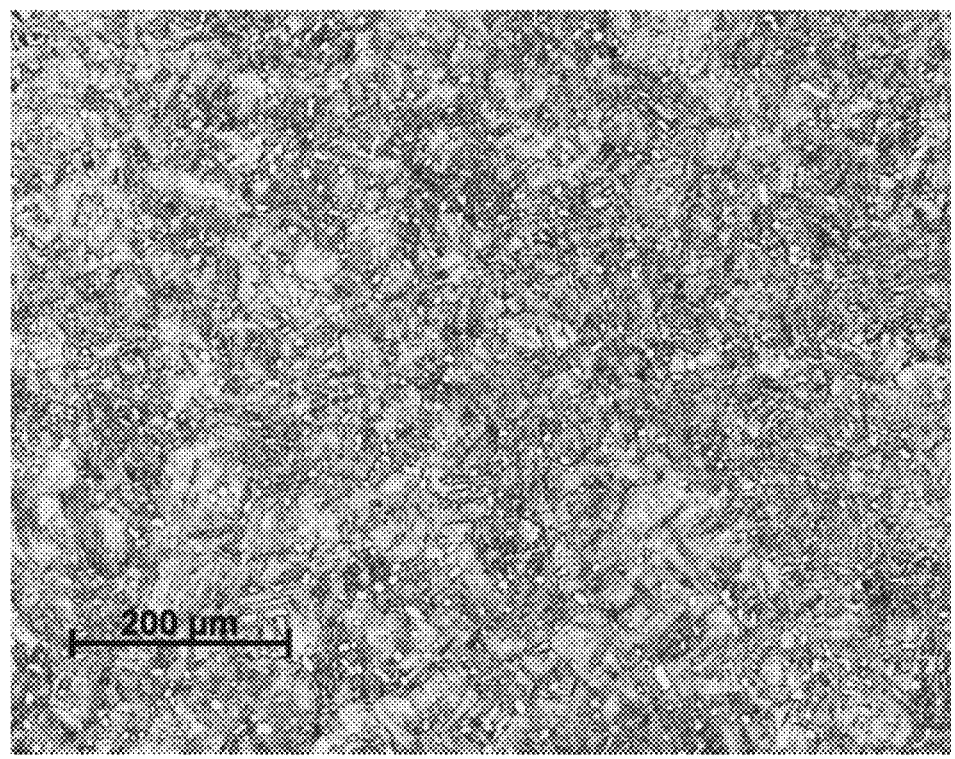
FIG. 10 is a micrograph of one embodiment of a Ti-6Al-4V final forged product, taken in the transverse direction.
Figure 11:
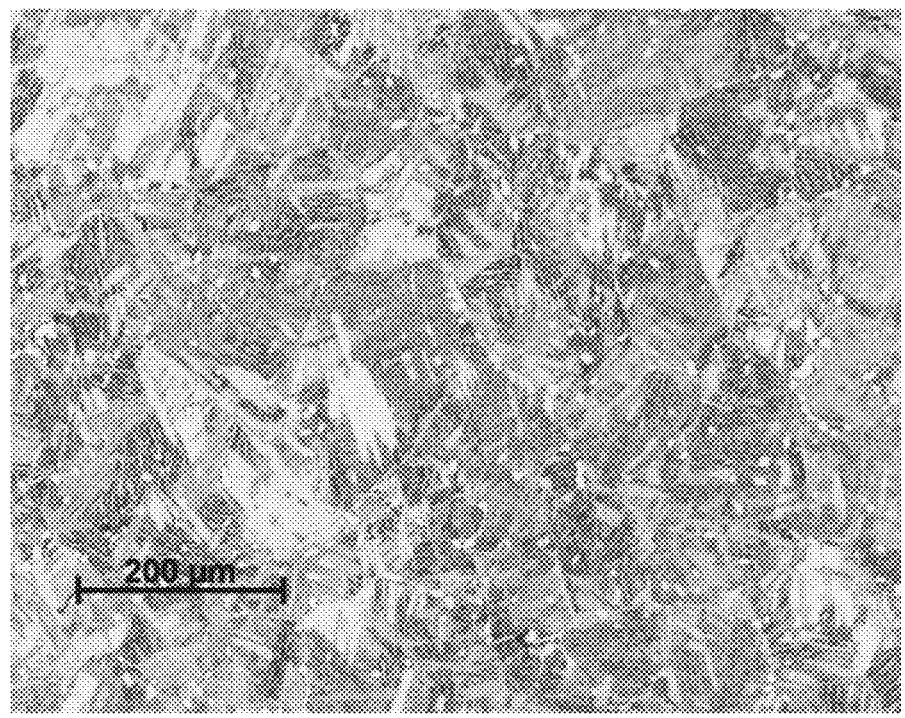
FIG. 11 is a micrograph of one embodiment of an annealed Ti-6Al-4V final forged product, taken in the transverse direction.

FIGS. 8-11 are micrographs showing the microstructures of the cylindrical preforms and cylindrical final forged products of Example 1. All of the micrographs were taken in the transverse orientation and at the midpoint of the cylinder. Referring now to FIG. 7, one embodiment of a cylindrical final forged product is illustrated. In the illustrated embodiment, the final forged product has been forged in the Z direction. The X-Y plane shown in FIG. 7 is the transverse orientation and the X-Z plane is the longitudinal orientation. Referring back to FIG. 8, a micrograph of a Ti-6Al-4V preform produced via additive manufacturing is shown. As can be seen in FIG. 8, the microstructure consists of transformed beta phase material with evidence of the prior beta phase grains. FIG. 9 is a micrograph of a additively manufactured Ti-6Al-4V preform that has been preheated to a temperature of about 1750° F. As can be seen in FIG. 9, the microstructure after heating is transformed beta phase material with the formation and growth of acicular alpha phase material. No primary alpha phase material is observed. FIG. 10 is a micrograph of an additively manufactured Ti-6Al-4V preform that has been preheated to a temperature of about 1750° F. and then forged to true strain of about 0.7 (e.g., a final forged product). As can be seen in FIG. 10 the preheating and forging steps result in a more refined grain structure, punctuated by the nucleation of primary alpha phase grains interspersed in the matrix. These interspersed primary alpha phase grains are observed as the small, white, circular dots. FIG. 11 is a micrograph of an additively manufactured Ti-6Al-4V preform that has been preheated to a temperature of about 1750° F., then forged to true strain of about 0.7, and then annealed at a temperature of about 1350° F. (e.g., an annealed final forged product). As can be seen in FIG. 11, in addition to the small, circular grains of primary alpha phase material interspersed in the matrix, primary grains of alpha phase material have formed as well.

While various embodiments of the present disclosure have been described in detail, it is apparent that modification and adaptations of those embodiments will occur to those skilled in the art. However, it is to be expressly understood that such modifications and adaptations are within the spirit and scope of the present disclosure.

What is claimed is:

1. A method comprising:
   (a) using additive manufacturing to produce a metal shaped-preform, wherein the metal shaped-preform comprises a titanium alloy; and
   (b) after the using step (a), forging the metal shaped-preform, in a single die forging step, into a final forged product;
   wherein the single die forging step is using a single blocker die to die forge the metal-shaped preform into the final forged product; and
   wherein the single die forging step comprises non-uniformly applying strain to the metal shaped-preform.

2. The method of claim 1, wherein the final forged product is a jet engine blade for a jet engine.

3. The method of claim 1, wherein the titanium alloy includes at least 50 wt. % Ti and at least one titanium aluminide phase, wherein the at least one titanium aluminide phase is selected from the group consisting of $Ti_3Al$, TiAl and combinations thereof.

4. The method of claim 1, wherein the titanium alloy includes 5-30 wt. % aluminum, and the titanium alloy comprises at least some $Ti_3Al$.

5. The method of claim 1, wherein the titanium alloy is a Ti-6Al-4V alloy.

6. The method of claim 1, wherein the forging step comprises:
   heating the metal shaped-preform to a stock temperature; and
   contacting the metal shaped-preform with a forging die, wherein, when the contacting step is initiated, the forging die is a temperature that is at least 10° F. lower than the stock temperature.

7. The method of claim 1, comprising:
   after the forging step (b), annealing the final forged product.

8. The method of claim 7, wherein the annealing step comprises heating the final forged product to a temperature of from 670° C. to 750° C.

9. A method comprising:
   (a) using additive manufacturing to produce a titanium alloy preform for a jet engine, wherein the titanium alloy preform comprises a titanium alloy; and
   (b) after the using step (a), forging the titanium alloy preform, in a single die forging step, into a jet engine blade for a jet engine;
   wherein the single die forging step is using a single blocker die to die forge the titanium alloy preform into the jet engine blade; and
   wherein the single die forging step comprises non-uniformly applying strain to the metal shaped-preform.

10. The method of claim 9, wherein the titanium alloy includes at least 50 wt. % Ti and at least one titanium aluminide phase, wherein the at least one titanium aluminide phase is selected from the group consisting of $Ti_3Al$, TiAl and combinations thereof.

11. The method of claim 9, wherein the titanium alloy includes 5-30 wt. % aluminum, and the titanium alloy comprises at least some $Ti_3Al$.

12. The method of claim 9, wherein the titanium alloy is a Ti-6Al-4V alloy.

13. The method of claim 9, wherein the forging step comprises:
   heating the titanium alloy preform to a stock temperature; and
   contacting the titanium alloy preform with a forging die, wherein, when the contacting step is initiated, the forging die is a temperature that is at least 10° F. lower than the stock temperature.

14. The method of claim 9 comprising,
   after the forging step (b), annealing the jet engine blade.

15. The method of claim 14, wherein the annealing step comprises heating the jet engine blade to a temperature of from 670° C. to 750° C.

16. A method comprising:
   (a) using additive manufacturing to produce a ring-shaped metal preform;
      (i) wherein the ring-shaped metal preform comprises one of a titanium alloy, an aluminum alloy, a nickel alloy, a steel, a stainless steel, and a metal matrix composite;
      (ii) wherein the using step comprises adding metal, via the additive manufacturing, to a building substrate thereby producing the ring-shaved preform;
      (iii) wherein the building substrate is a first ring of a first metal material, wherein the additive manufacturing comprises adding a second metal material to the first ring thereby forming a second ring integral with the first ring, wherein the ring-shaped metal preform comprises the first ring and the second ring; and
   (b) after the using step (a), working the ring-shaped preform into a final worked ring-shaped product via at least one of ring rolling and ring forging.

17. The method of claim 16, wherein the first metal material is the same as the second metal material.

18. The method of claim 16, wherein the first metal material is different than the second metal material.

19. The method of claim 18, comprising:
   first selecting a high toughness material as the first metal material;
   second selecting a high strength material as the second metal material;
   after the first selecting step and after the second selecting step, completing the using step (a) and the working step (b).

20. The method of claim 19, comprising:
   after the working step (b), using the final worked ring-shaped product as an engine containment ring in an aerospace engine.

* * * * *